(No Model.)

L. H. LETZ.
MILLSTONE.

No. 437,699. Patented Oct. 7, 1890.

Witnesses:
Arthur Lotz
Otto Luebkert

Inventor.
Louis Holland Letz
By Wen H Lotz
his Attorney

UNITED STATES PATENT OFFICE.

LOUIS HOLLAND LETZ, OF CROWN POINT, INDIANA.

MILLSTONE.

SPECIFICATION forming part of Letters Patent No. 437,699, dated October 7, 1890.

Application filed April 12, 1890. Serial No. 347,577. (No model.)

*To all whom it may concern:*

Be it known that I, LOUIS HOLLAND LETZ, a citizen of the United States of America, residing at Crown Point, in the county of Lake and State of Indiana, have invented certain new and useful Improvements in Millstones, of which the following is a specification, reference being had therein to the accompanying drawings.

This invention relates to grinding-disks principally for feed-mills, and more particularly to the dress of such disks, with the object in view of reducing the grain more by a shearing than by a crushing or grinding action, whereby proportionately less power will be required for the operation, and of providing a free circulation of air between the faces of the disks, whereby the disks, as well as the grain will be kept cool; and with these objects in view my invention consists of the novel devices and combination of devices hereinafter described and specifically claimed.

Figure 1:
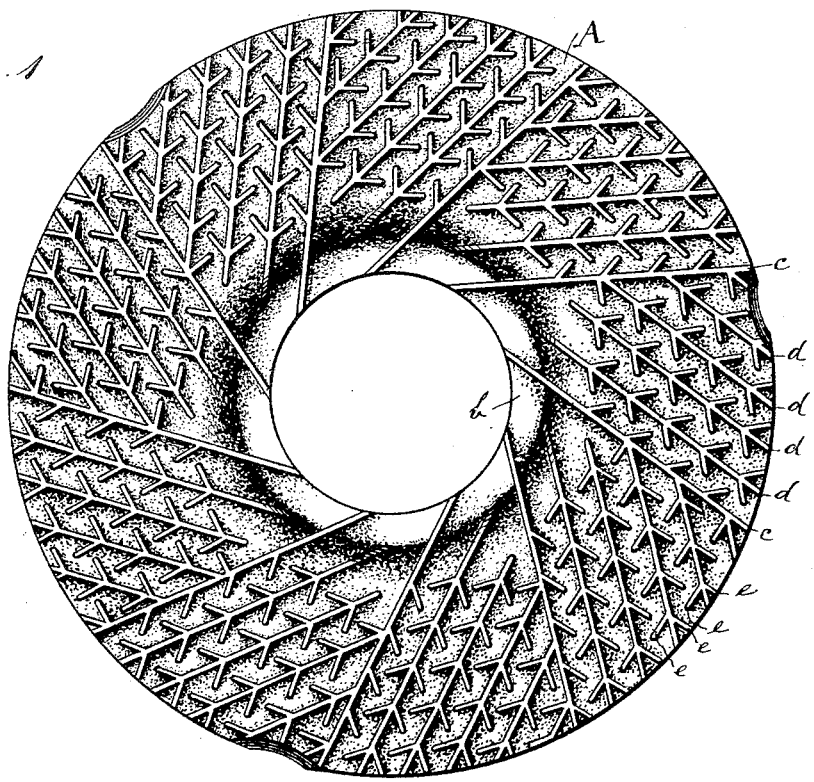
Figure 2:
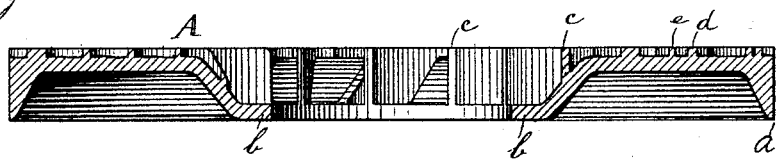

In the accompanying drawings, Figure 1 represents a face view of one of the grinding-disks, the bed and runner to have the same dress; and Fig. 2 represents a vertical section through the diameter-line of the same.

The same letters of reference in the several figures of the drawings designate like parts.

The disk A is provided on its back with a circumferential flange $a$, and around its eye it is formed with a concavity $b$. The face of this disk A is equally divided by a series of main ridges $c$, all drawn on lines extending obliquely from a radial direction, and between each two such main ridges $c$ are again provided a series of ridges $d$, parallel with each other and with one of the main ridges $c$ and on an oblique position toward the other ridge $c$. These ridges $d$ of each division between two ridges $c$ decrease in length and the shorter ridges $d$ connect with that ridge $c$ to which they stand obliquely, so as to form branches thereof, while the longer ridges $d$, extending to near the eye of the disk, terminate near the concavity $b$ of such eye. The ridges $c$ extend to the very edge of the eye of the disk on the same horizontal plane, and hence their vertical projection above the body of the disk is more at the concavity $b$ around such eye.

Each ridge $c$ and $d$ is formed with a series of angularly-branching ridges $e$, all of about equal length, which ridges $e$ of two adjacent ridges $c$ or $d$ are placed alternately, whereby the furrow between two ridges $c$ $d$ is obstructed in a manner to leave a zigzag course or leadway only for the grain and air to move therein, each branch ridge $e$ of one ridge $c$ or $d$ guiding the grain in a relative rectangular direction toward the branch ridge $e$ of the adjacent ridge $c$ or $d$. These ridges $c$, $d$, and $e$ being narrow square projections from the face of disk A and the dress of the stationary and the runner disk being exactly alike, the ridges $c$ and $d$ of the two opposing disks will be relatively nearly at right angles, whereby with the rotation of one disk these opposing ridges will operate like shearing-edges for cutting or breaking the grain, the branch ridges $e$ preventing the grain from escaping through the furrows without being reduced. The centrifugal force of the runner-disk will cause currents of air to pass through the furrows from the eye of the disk toward the periphery thereof on a zigzag course, which air, besides cooling the faces of the disks, will also assist in moving the kernels of grain into the corners formed by the junction of a branch ridge $e$ with a ridge $c$ or $d$.

The two opposing disks may be adjusted the desired distance apart for reducing the grains more or less, and by allowing the ridges $c$, $d$, and $e$ of the two disks to be in frictional contact by wearing down their faces the shearing-edges of the ridges will be automatically sharpened.

The disks are formed of metal of any suitable kind and are preferably cast.

What I claim is—

1. A millstone having a central depression $b$ around the eye-ridges $c$, which extend from the eye to the rim of the stones, the grinding-faces being straight from end to end, and the ridges $d$ $d$, terminating short of the depression $b$, all of said ridges having short angular branches $e\ e$, as set forth.

2. A millstone having ridges $c$ equal distances apart on lines obliquely deflecting from a radial line, ridges $d$, parallel with each other and with one of the ridges $c$ of each division, and ridges $e$, forming angular branches to ridges $c$ and $d$ in alternately-opposite positions, all of these ridges being square projections from the faces of the disks, substantially as set forth.

In testimony whereof I affix my signature in presence of two witnesses.

LOUIS HOLLAND LETZ.

Witnesses:
WILLIAM H. LOTZ,
OTTO LUEBKERT.